(12) United States Patent
St. Amant et al.

(10) Patent No.: US 7,803,337 B1
(45) Date of Patent: Sep. 28, 2010

(54) METHOD FOR TREATING A FLUID TO BE SCRUBBED

(75) Inventors: Jefferey St. Amant, League City, TX (US); Kenneth R. Matheson, Corpus Christi, TX (US)

(73) Assignee: Vapor Point, LLC, La Porte, TX (US)

( * ) Notice: Subject to any disclaimer, the term of this patent is extended or adjusted under 35 U.S.C. 154(b) by 0 days.

(21) Appl. No.: 12/492,079

(22) Filed: Jun. 25, 2009

Related U.S. Application Data

(63) Continuation-in-part of application No. 12/365,582, filed on Feb. 4, 2009.

(60) Provisional application No. 61/063,901, filed on Feb. 6, 2008, provisional application No. 61/065,720, filed on Feb. 14, 2008.

(51) Int. Cl.
*B01D 53/34* (2006.01)

(52) U.S. Cl. .................. 423/210; 423/220; 423/226; 423/228; 423/238; 423/242.1; 423/242.2; 423/245.2; 96/4; 96/5; 95/45; 210/600; 210/660; 210/690; 210/908

(58) Field of Classification Search ............... 423/210, 423/220, 226, 228, 238, 242.1, 242.2, 245.2; 96/4, 5; 95/45; 210/600, 660, 690, 908
See application file for complete search history.

(56) References Cited

U.S. PATENT DOCUMENTS

| 5,122,165 A | 6/1992 | Wang et al. |
| 6,592,782 B2 * | 7/2003 | MacKay et al. ............ 252/500 |
| 7,147,689 B1 | 12/2006 | Miller |

* cited by examiner

*Primary Examiner*—Timothy C Vanoy
(74) *Attorney, Agent, or Firm*—Buskop Law Group, PC; Wendy Buskop

(57) ABSTRACT

A method for treating a fluid to be scrubbed, comprising filling a scrubber with a volume of biodiesel or biomass adequate to cover a sintered permeable membrane in the reaction chamber and a bit more to create a reaction zone in not only a plurality of pores in the membrane with fluid but in a reaction zone above the membrane, then introducing fluid to be scrubbed to the membrane, building up pressure in the reaction chamber, and passing a scrubbed fluid from the reaction zone to an exit port at a rate equal to the rate the fluid to be scrubbed is introduced.

9 Claims, 9 Drawing Sheets

METHOD FOR TREATING A FLUID TO BE SCRUBBED

CROSS REFERENCE TO RELATED APPLICATIONS

The present application is a continuation in part application which claims priority to U.S. patent application Ser. No. 12/365,582 filed on Feb. 4, 2009, entitled "Method for Treating Gases to be Scrubbed", which further claims priority to U.S. Provisional Application Ser. No. 61/063,901 filed on Feb. 6, 2008, entitled "Gas/liquid contact device" and U.S. Provisional Application Ser. No. 61/065,720 filed on Feb. 14, 2008, entitled "Gas/liquid contact device". These references are incorporated herein.

FIELD

The present embodiments generally relate to method for the removal and recovery of unwanted contaminants, such as volatile organic compounds (VOCs), from a fluid.

BACKGROUND

A need exists for a method for cleaning a fluid from contaminates with up to about 100 percent efficiency and no less than about 70 percent efficiency.

A further need exists for a method for scrubbing a fluid with contaminates like benzene that does not require utilities and does not generate heat.

A further need exists for a method for cleaning a fluid of contaminates that operates at low pressures and is safer to operate than method that require high pressures.

The present embodiments meet these needs.

BRIEF DESCRIPTION OF THE DRAWINGS

The detailed description will be better understood in conjunction with the accompanying drawings as follows.

Figure 1:
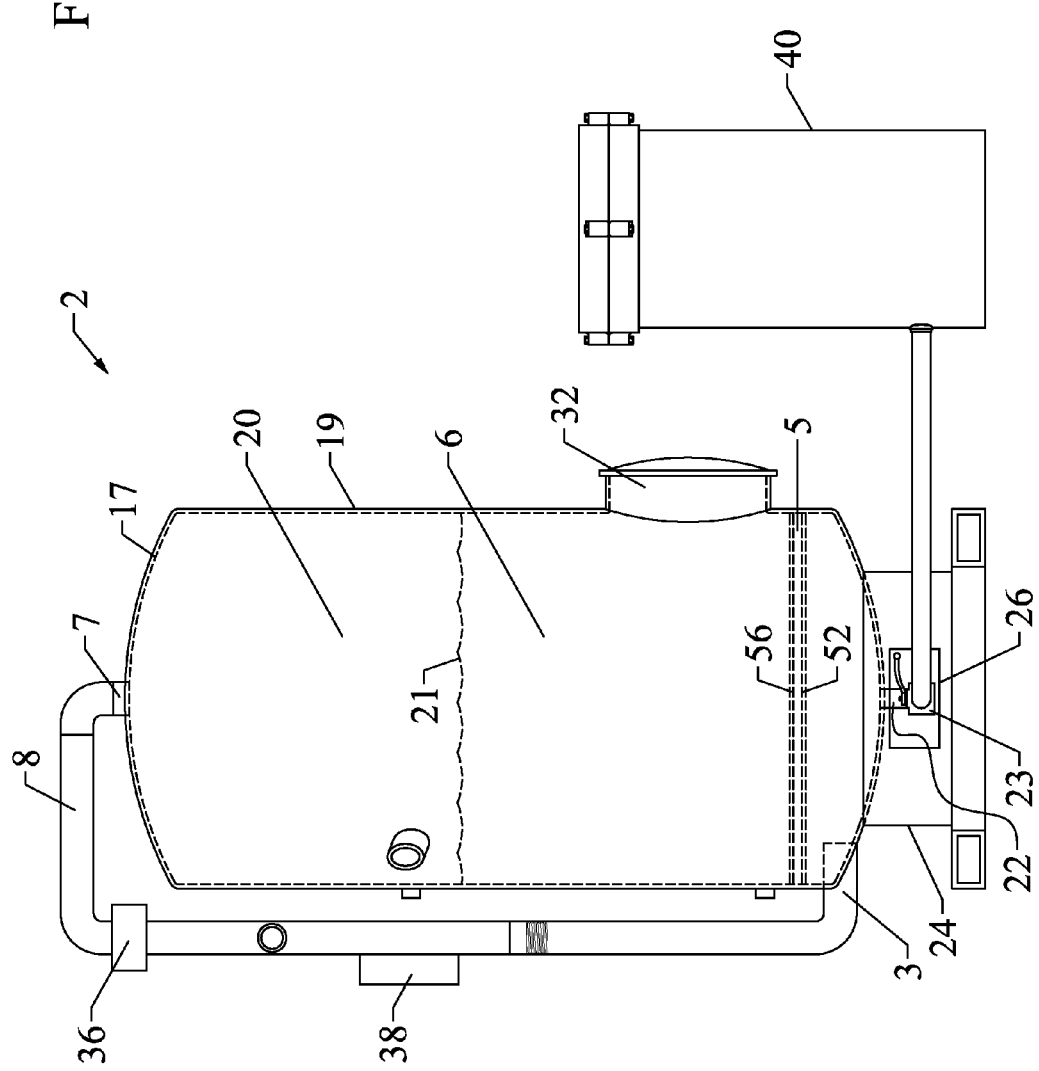
FIG. 1 is a schematic drawing of a system for use with the method.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to method for treating fluid, such as a fluid to be scrubbed for removing volatile organic compounds (VOCs).

Volatile organic compounds (VOCs) are organic chemical compounds that have high enough vapor pressures under normal conditions to significantly vaporize and enter the atmosphere. VOCs include a wide range carbon based molecules, including benzene, toluene, xylene, ethylene, aldehyde, ketones, and other light hydrocarbons.

The present embodiments relate to a method for treating a fluid to be scrubbed that involves the steps of filling a scrubber having a reaction chamber with biodiesel or biomass that covers a sintered permeable membrane disposed across in the reaction chamber and additionally fills the reaction chamber an additional 20 percent; introducing the fluid to be scrubbed from a source to the reaction chamber on a first side of the sintered permeable membrane; building up pressure in the reaction chamber forming a reaction zone in the sintered permeable membrane; intermingling the fluid to be scrubbed with biodiesel or biomass in the sintered permeable membrane; forming a reaction zone above the sintered permeable membrane; producing scrubbed fluid in the reaction zone; passing the scrubbed fluid to an exit port at a rate equal to the rate which the fluid to be scrubbed is treated in the reaction zone while creating a pressure drop of at least 0.2 psi in the reaction chamber wherein the scrubbed fluid has an initial drop in contamination concentration of at least about 99 percent gradually decreasing to about 70 percent as additional fluid to be scrubbed is introduced to the sintered permeable membrane without replacing the biodiesel or biomass. It should be appreciated the term fluid as used herein refers to both liquids and gases.

Biodiesel refers to a non-petroleum based hydrocarbon consisting of short chain alkyl (methyl, ethyl, etc) esters manufactured by the transesterification (Alcoholysis) of plant and animal fats. Fatty acids are aliphatic carboxylic acids with varying hydrocarbon lengths at one end of the free chain joined to a terminal carboxyl (—COOH) group at the other end. Fatty acids are predominately unbranched, but can be branched, and those with chain lengths that are even and between 12 carbons and 22 carbons react with glycerol to form lipids. The biodiesel can have a flashpoint between about 130 degrees Centigrade to about 390 degrees Centigrade. The biodiesel can have a specific gravity of between about 0.87 to about 1.4 specific gravity. Biodiesel is hydrophobic (non-miscible with water molecules).

Biodiesel is also known to be hygroscopic (attracting water molecules from the atmosphere) increasing both its solvent capacity and its solubility speciation. This amphiphilic biodiesel blend having a polar water soluble group attached to a non-polar, water insoluble hydrocarbon chain captures or recovers volatile organics, BTEX and heavier hydrocarbons that would otherwise be lost to the atmosphere/environment, incinerated by flare or oxidation (creating $CO_2$ and NOx) or land filled.

The ethyl, butyl, and larger alkyl esters have non-polar chains in the head groups that are sufficient in size to shield the forces between the more polar positions of the head group, presenting somewhat different solvency/solubility. It has been demonstrated that blends of chain lengths and saturation can create broad spectrum selectivity/solvency to cover the broad speciation of VOC's/BTEX common in industrial plant manufacture activities.

Fatty acids that are saturated have no double bonds, while unsaturated (or polyunsaturated) have one or more double bonds. Stearic acid (octadecanoic acid) is the most common long chain fatty acid derived from both animal and vegetable fats, commonly used as a lubricant and as an additive in industrial preparation. Some fatty acids usable herein include: Lauric, Myrlstic, Palmitic, Stearic, Oleic, Ricinoleic, Vaccenic, Linoleic, Alpha-Linolenic, Gamma-Linolenic, Arachidic, Gadoleic, Arachidonic, Behenic, Erucic, and Lignoceric.

Biomass, sometimes referred to as biofuel, can be defined as solid, liquid or gaseous materials derived from recently dead biological materials while fossil fuels are derived from long dead biological material. Non-petroleum hydrocarbons can be produced from any biological carbon source; although the most common sources are from photosynthesis plants and animal fats. Biomass is materially derived from recently living organisms including plants, animals, and their by products, a renewable energy/recovery source based upon the carbon cycle, unlike fossil and nuclear sources. Animal waste is an unavoidable pollutant. Agricultural products are specifically grown that produce/contain high amounts of vegetable oils and sugars that can be readily converted to non-petroleum based hydrocarbons. Non-petroleum based hydrocarbons do not have a net increase in $CO_2$, when used as an energy/recovery source because as the plants are initially grown they consume or remove $CO_2$ from the atmosphere.

The scrubber can have a housing. The housing can be a ball or a rounded rectangular housing, such as a rectangular box with rounded corners.

In an embodiment, if the housing is a ball, the housing can have up to a 128 inch diameter. Whether ball shaped or rectangular shaped, the housing can have a height up to 120 inches, seam to seam. The housing can be made from carbon steel, stainless steel or steel alloys, aluminum, bronze, brass copper, polyethylene, polypropylene, tungsten, PVC, reinforced fiberglass, concrete or combinations of these materials. The housing can have one or more reinforcing ribs on either the inside or outside of the scrubber. The housing is resistant to explosion with pressures up to about 25 psi. It is contemplated that the housing can resist explosion at internal pressures up to about 2500 psi. The housing can further have a wall thickness of about $3/16^{th}$ inch which can further contain a reaction chamber.

The housing can be filled with a biodiesel or biomass that can be a methyl ester, a blend of animal fat and vegetable oil, in a ratio of 80:20 blend.

The housing can also contain a sintered permeable membrane, which can be disposed across the interior of the housing forming a reaction chamber in the membrane. The biodiesel or biomass can be about 20 inches above the sintered permeable membrane, or at least 20 percent of the volume of the housing In this example the sintered permeable membrane can be about $1/8^{th}$ inch thick and can be made of a porous plastic material. The sintered permeable membrane can further have pores with sizes of about 50 microns. The sintered permeable membrane can be comprised by more than one $1/8^{th}$ thick sheets. An example of can be manufactured by GenPore of Reading, Pa.

The fluid to be scrubbed can be introduced through an inlet in the housing below the sintered permeable membrane. The fluid to be scrubbed can be introduced at about 350 cubic feet per minute (CFM).

As the fluid to be scrubbed entered the vessel, a reaction zone is then created in the sintered permeable membrane.

The biodiesel or biomass can then be passed through the membrane, as pressure builds up in the reaction chamber, forming a reaction zone of biodiesel or biomass against a head pressure for introducing the fluid to be cleaned.

The fluid to be scrubbed can then be intermingled in the pores of the sintered permeable membrane, removing some contaminates while the fluid to be scrubbed was in the pores. Fluid can then be flowed from the pores to a reaction zone of biodiesel or biomass above the sintered permeable membrane for additional removal of contaminates through migration of the fluid through the biodiesel or biomass.

The scrubbed fluid can then be passed to an exit port at a rate of about 350 CFM which can be identical to the rate of introduction of the fluid to be scrubbed.

Pressure can then be dropped across the system, including the housing, to at least about 0.4 psig.

The scrubbed fluid resulting from the scrubbing process can have an initial drop in contamination concentration of benzene of about 99.99 percent for at least about 24 hours and this high level of cleaning gradually decreased to about 78 percent over about a 7 day period because the biodiesel or biomass was not replaced or recycled.

The method uses turbulent flow, which can be non-foaming to low foaming, and the method can recover between about 90 percent to 99 percent of volatile organic contaminates when using biodiesel. Laminar flows of this method could be used, but would not produce the same efficiency.

The continuous cleaning process with one volume of biodiesel or biomass can have many advantages, and one of the best advantages is that it can be used in remote areas without utilities.

An embodiment can contemplate a method of replenishing the biodiesel or biomass through a recycle step.

Additional embodiments of the invention can contemplate that the biodiesel or biomass can be filled in the housing to about 25 percent and up to about 33 percent of the volume of the reaction chamber.

In an embodiment, it can be further contemplated that fluid can rise with the fluid into areas of the reaction chamber above the biodiesel or biomass. To manage this fluid that escapes the main body of fluid, a dissipation area can be maintained in the reaction chamber above the biodiesel or biomass for removing enriched liquid containing the contaminates from the scrubbed fluid.

The embodiments can contemplate an additional step, which can include filling the biodiesel or biomass into the housing at a rate equivalent to the rate of venting scrubbed fluid from the reaction chamber.

The embodiments can also contemplate that the filling of the housing with the fluid to be scrubbed can create between about 0.5 pounds to about 14 pounds of pressure in the reaction chamber to more effectively remove contaminates from the scrubber. The term "more effectively remove contaminates" can refer to the saturation capacity of the biodiesel or biomass, that is, the saturation capacity of the biodiesel or biomass goes up, so that the biodiesel or biomass effectively and efficiently removes contaminates from the fluid to be scrubbed for longer periods of time without having to refill the biodiesel or biomass.

In an embodiment, the fluid to be scrubbed can be introduced to the reaction chamber at a rate between about 0.1 cubic feet per minute (CFM) to about 20,000 CFM such as using a vacuum pump.

The sintered permeable membrane in an embodiment can be flexible and bendable, and can be shaped. The term "bendable" can refer to an ability to fold the membrane which can be about 48 inches wide to go through a 20 inch manway.

The term "tubular" when associated with the membrane can mean that the membrane can be formed in the shape of a tube, or a cone, and inserted into the housing so that the fluid to be scrubbed can be introduced to the center of the tubular, and the membrane forms a reaction zone along with biodiesel or biomass pushed through the cone or tubular to the outside of the tubular.

The invention can contemplate a system, which can be useable with the embodied method for removing unwanted contaminates from fluid using a scrubber. A system usable with this method can have a housing with a reaction chamber having a liquid level, an inlet connected to a source containing fluid to be scrubbed with a contamination concentration greater than zero ppb to saturation. An exit port can be connected to the housing and can be used for evacuating scrubbed fluid and a sintered permeable membrane can be disposed across the reaction chamber, which can provide a reaction zone in the plurality of pores when the fluid to be scrubbed is introduced to the membrane on a first side while the membrane is immersed in the biodiesel or biomass; and a cleaned fluid on a second side wherein the clean fluid initially has a drop in contamination concentration of at least about 99 percent and gradually decreasing to about 70 percent as additional fluid to be scrubbed is introduced to the plurality of pores without replacing the biodiesel or biomass.

The housing can be mounted on a pedestal horizontally or vertically. The housing can be a ball, a rounded rectangular housing or of other geometric configurations. The pedestal can support the housing, which as described herein can be referred to as "scrubber". The pedestal can have an access port that connects to a drain port in the housing. The pedestal can be a ferrous or non-ferrous material but must be strong enough to support the weight of the housing with other components installed therein. The pedestal can be modular with the housing, that can be removably detachable from the housing, so that both units can be easily truck mounted without the need for special permits when moved on a highway.

In an embodiment, the pedestal can be a mobile trailer, that is, a moveable pedestal as a trailer, but fixed into the trailer construction.

The embodied system usable with the method can be usable with a modular transportable system for removing unwanted contaminates from fluid. The system can further comprise a movable transport vehicle and a removably modular scrubber disposed on the moveable transport vehicle.

An example of a movable transport vehicle can be a barge, a trailer, a barge with a trailer disposed on the barge, a truck, a ship, a rail car with a trailer disposed thereon.

The embodied method can also be usable with a vacuum truck. The vacuum truck can have a bed with at least one vacuum pump, a vacuum pump exhaust and at least one scrubber integrally and non-removably connected to the bed of the vacuum truck. At least one scrubber engages the vacuum pump exhaust, and subsequent scrubbers can be connected in series to the at least one scrubber.

As a benefit, the method does not require hooking up to any plant, municipal or state utilities to operate. The method can be truck mounted, and using pressure and minimal energy, produces "cleaned" or "scrubbed fluid" that meets federal codes for clean air. No outside service needs to be planned for, and the scrubber can be used in remote or isolated locations where utilities are not available, such as in the Arctic Circle.

Certain embodiments provide the benefit of utilizing biodiesel or bio fuel for treating a fluid. One such benefit is the ability to reuse or recycle the biodiesel or biofuel, providing no waste bi products as the recycled material can be reprocessed through distillation to produce refined products such as liquidified benzene. Another benefit is the increased efficiency in the removal of VOCs, as other medium only have a demonstrated ability to absorb up to about 30 percent by weight biodiesel or biomass is capable of absorbing between about 50 percent to about 100 percent by weight. Another benefit in the use of biodiesel or biomass is the biodegradable, environmentally safe nature of the product.

The method can provide tremendous versatilities applied to scrubbers that can be modular or multiple scrubbers that can be hooked up in series or in parallel with varying capacities and abilities to remove different contaminates.

The method works on a scrubber with no moving parts, so the method is more reliable than others causing lower costs because of fewer repairs and literally no down times due to maintenance issues.

The method can result in a reduction in possibility of regulatory fines for users and a reduction in administrative costs resulting from emission events due to equipment failures.

The method can provide an efficiency in removal of contaminates of up to about 100 percent and at least about 70 percent.

The method can contemplate using a volatile compound, which can include, but is not limited to hazardous air pollutants, benzene, toluene, or less volatile compounds such as ethylene, xylenes, hexane, ethanols, MTBE, chlorinated hydrocarbons, aromatic compounds, acid gases and combinations thereof.

The method can further contemplate using a housing that can be double walled or single walled. The housing can be insulated. The housing can be adapted to provide heat tracing results during use.

The housing can include an interior liner. The liner can surround the reaction zone in the housing. The liner can be film, a thermoplastic or composite coating, a phenolic resin coating, an epoxy paint, a rubber or combinations thereof.

Biodiesel or biomass can be filled through a liquid fill port in the housing. One biodiesel or biomass or blends of two or more biodiesels or biomasses can be used for treating the fluid added to the reaction zone.

Biodiesel or biomass, as described above, is a nonpetroleum based organic product having a viscosity related to the feedstock of the product, and wherein the product is made of fatty acid methyl esters from cooking oil, animal fats, plants such as algae, or vegetable oils by trans-esterification of those fats, plants and/or oils with alcohol. The biodiesel can have a flashpoint between about 130 degrees Centigrade to about 390 degrees Centigrade. The biodiesel can have a specific gravity of between about 0.87 to about 1.4 specific gravity The fluids to be scrubbed can be a fluid with contaminates that are organic compounds, hazardous air pollutants, hydrogen sulfides, ammonia, sulfur dioxide and combinations thereof. The amounts to be scrubbed for refineries for certain streams have different percentages than for a chemical plant, and the amounts to be cleaned depend on the location of the plant having the fluid to be scrubbed.

For example, in Corpus Christi, Tex., a fluid to be scrubbed can be a stream of gas with more than about 5 ppm benzene as of Jan. 29, 2009.

The fluid to be scrubbed can be anticipated to be gases that exceed federal Environmental Protection Agency "EPA", Title 40 regulations as of Jan. 1, 2009 and Texas Commission on Environmental Quality, Title 30 regulations regulatory levels as of Jan. 1, 2009.

Turning now to the Figures, FIG. 1 shows a scrubber 2 with a housing 19 on a pedestal 24. Inside the housing 19 can be a reaction chamber 20 with a drain port 22. The drain port can flow to a collection tank 40.

The drain port 22 can be a sump and a drain tube, or a siphon tube can extend into the drain port to remove any liquid in the reaction zone using a pump. The sump and drain tube embodiment can be particularly useful with roll off container embodiments of the scrubber when hazardous materials are used.

The drain port 22 can have a drain valve 23, such as a ball valve, a gate valve or a butterfly valve, such as those made by Fisher of Stockham, which can control the flow from the drain port 22 to the collection tank 40.

In an embodiment, the pedestal 24, for supporting the scrubber 2, can have a pedestal access port 26, which can be a square cut entry or rectangular cut entry between about 6 inches by about 8 inches to about 12 inches by about 24 inches for allowing individuals or operator's access to the drain valve 23.

Also shown in FIG. 1 is a manway 32 in the housing for providing access to the inside of the housing to clean and maintain the reaction chamber or to replace the sintered permeable membrane. The manway, in an embodiment can be a locking entry with a diameter of about 20 inches.

Figure 6:
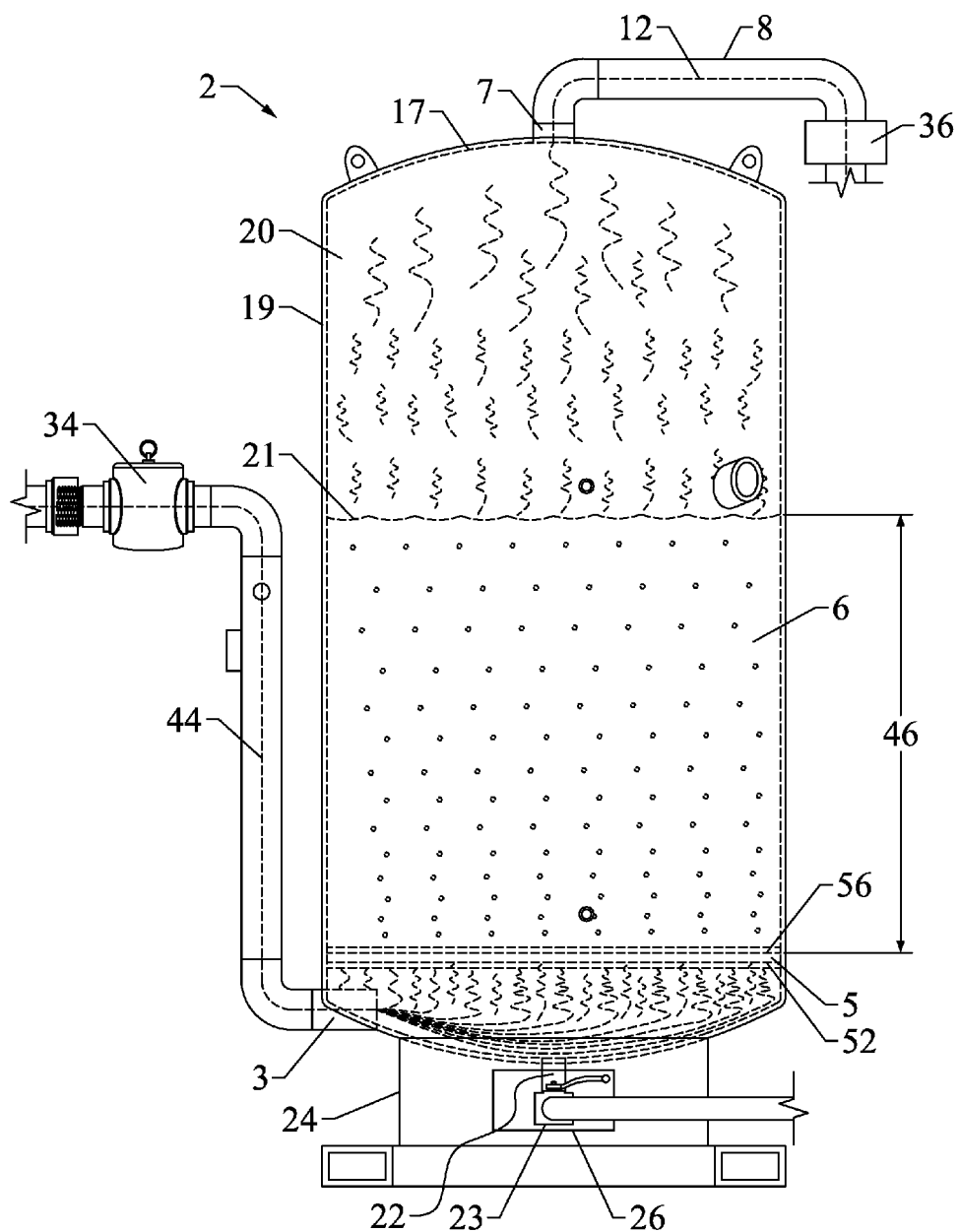
FIG. 6 shows the method after a fluid to be scrubbed has been introduced to the system.

The reaction chamber 20 can also have an exit port 7. The exit port can be between about 3 inches to about 24 inches in diameter and can be used to evacuate scrubbed fluid 12, which is shown in FIG. 6, that has been processed with this scrubber.

In an embodiment, the exit port can be contemplated to have the identical diameter to the inlet.

In still another embodiment, the exit port can have a diameter at least equal to the inlet.

An exit conduit 8 can be connected to the exit port 7 for allowing the scrubbed fluid to vent to the atmosphere or to another container.

A knock out canister 36, such as those custom made by Proco of Kingsville, Texas, can serve to knock out, remove, or capture any of the liquid that can be entrained in the scrubbed fluid 12 The knock out canister 36 can be located between a vent 38 and the exit conduit 8.

The reaction chamber 20 can be filled with a biodiesel or biomass 6 creating a liquid level 21. During scrubbing the biodiesel or biomass 6 can move up and down in the reaction chamber 20 providing variable liquid levels 21 with the biodiesel or biomass 6 herein.

Biodiesel or biomass, as described above, is a nonpetroleum based organic product having a viscosity related to the feedstock of the product, and wherein the product is made of fatty acid methyl esters from cooking oil, animal fats, plants such as algae, or vegetable oils by trans-esterification of those fats, plants and/or oils with alcohol. The biodiesel can have a flashpoint between about 130 degrees Centigrade to about 390 degrees Centigrade. The biodiesel can have a specific gravity of between about 0.87 to about 1.4 specific gravity.

The housing 19 can include an interior liner 17. The interior liner can line the inside of the entire housing. The interior liner can be film, a thermoplastic or composite coating, a phenolic resin coating, an epoxy paint, a rubber or combinations thereof.

Figure 2:
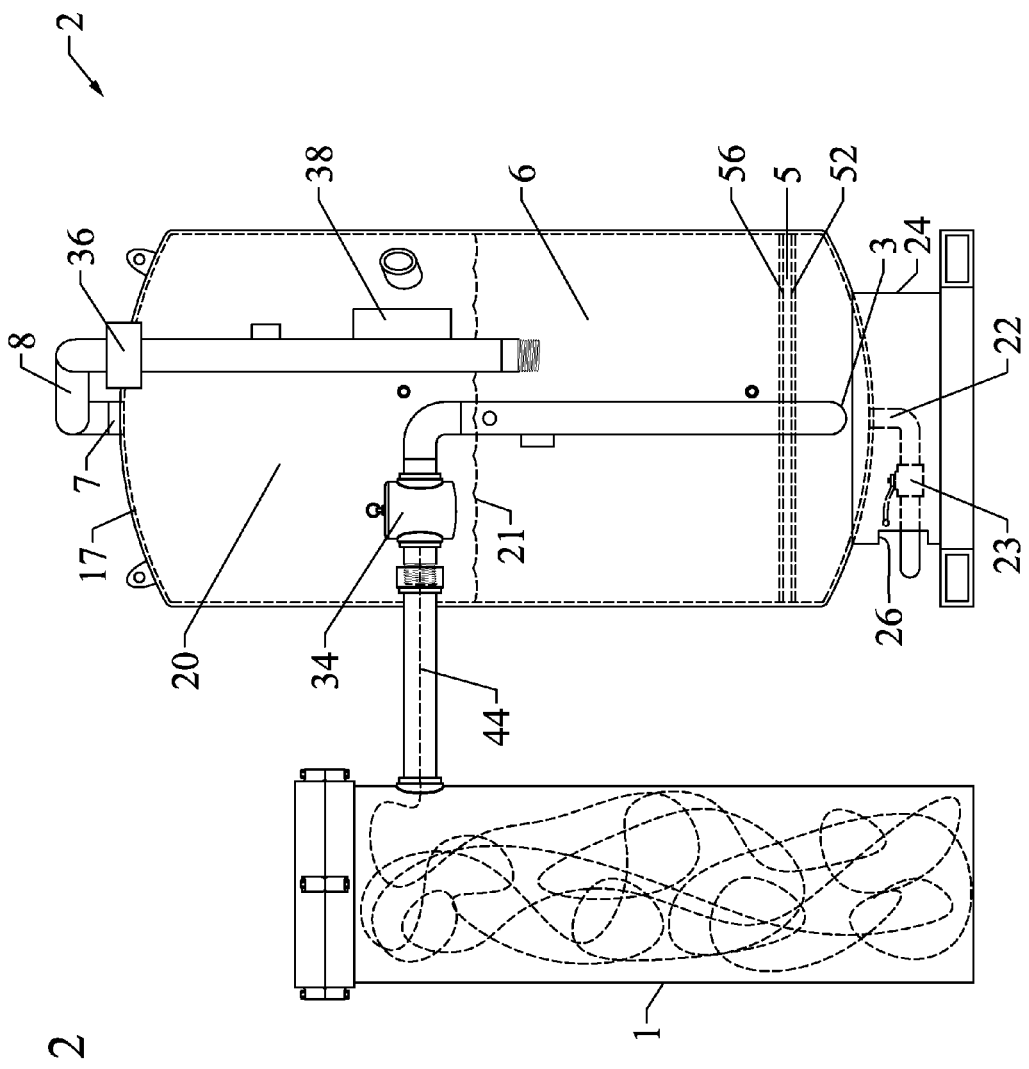
FIG. 2 is an alternative view of a system for use with the method.

The housing 19 can also have an inlet 3. The inlet 3 can be connected to a source 1, that contains the fluid to be scrubbed 44, which is shown in FIG. 2, The inlet 3 can be below the liquid level 21 in the reaction chamber 20.

The inlet 3 can be about a 3 inch to about 24 inch diameter inlet with flow rates that can range from about 1 cubic feet per minute to about 20,000 cubic feet per minute.

In an embodiment it can be contemplated that the inlet 3 can be positioned in the housing 19 to insure that the fluid to be scrubbed is introduced to the biodiesel or biomass 6 initially.

FIG. 1 also shows a sintered permeable membrane 5, with a first side 52 and a second side 56, which can be disposed across the reaction chamber 20, extending from wall to wall of the housing 19, with or without the interior liner 17.

FIG. 2 depicts an alternate embodiment of the scrubber 2 connected to a source 1 of fluid to be scrubbed 44.

In FIG. 2, an inlet check valve 34 is shown positioned between a source 1 of fluid to be scrubbed 44 and the inlet 3 of the scrubber 2. The inlet check valve 34 can be used to control the flow of fluid to be scrubbed 44 through the inlet 3. The inlet check valve 34 can be a low pressure valve, such as between about 1 psi to about 100 psi. The inlet check valve 34 can also be a swinging check valve. A feature of the embodiments is that the inlet pressure can be low, making this scrubber safer than high pressure scrubbers.

Figure 3:
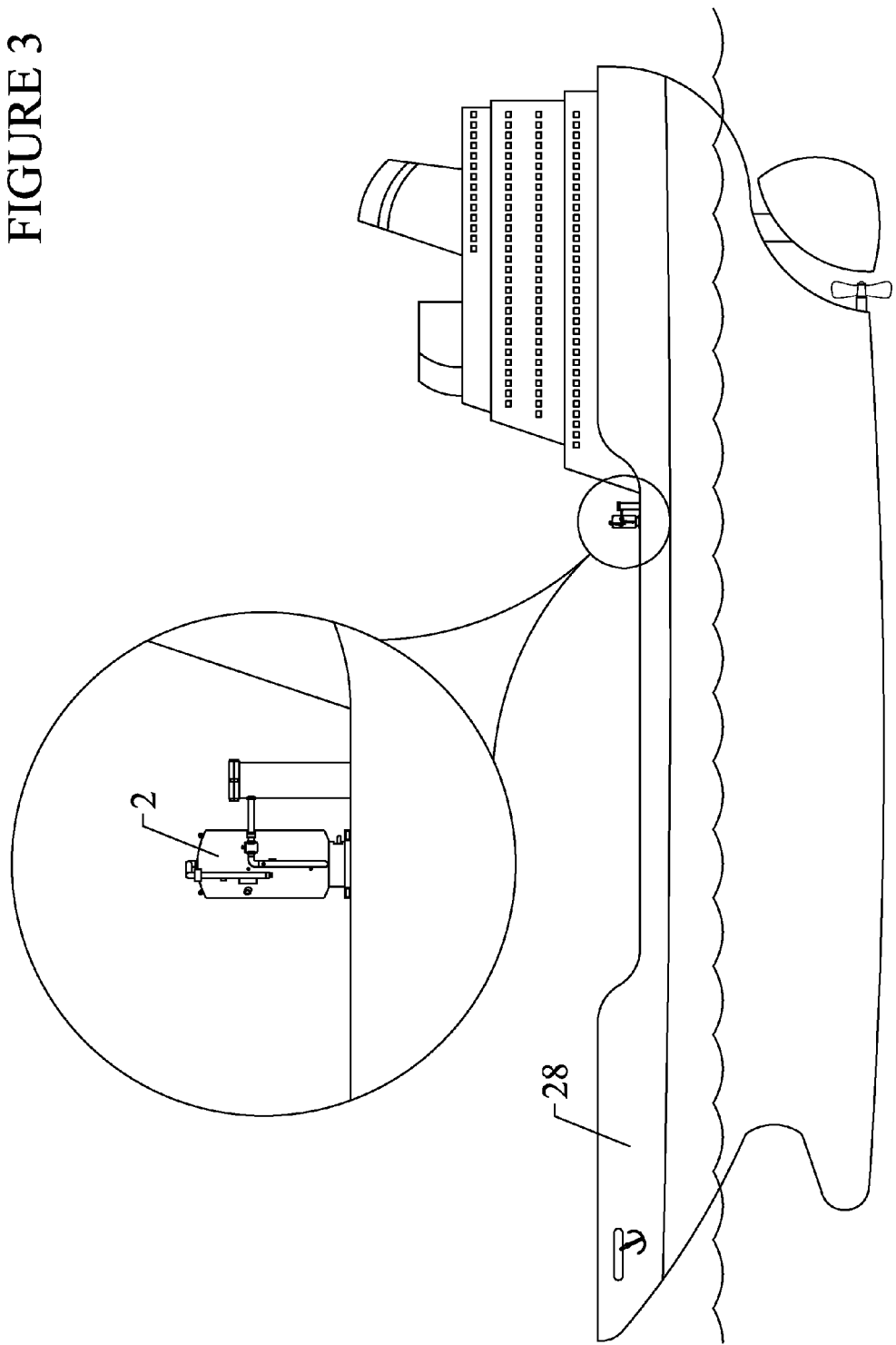
FIG. 3 illustrates an embodiment that shows how the method can be used on a ship.

FIG. 3 shows an embodiment of the scrubber 2 on a movable transport vehicle 28 that in this version is a barge.

Figure 4:
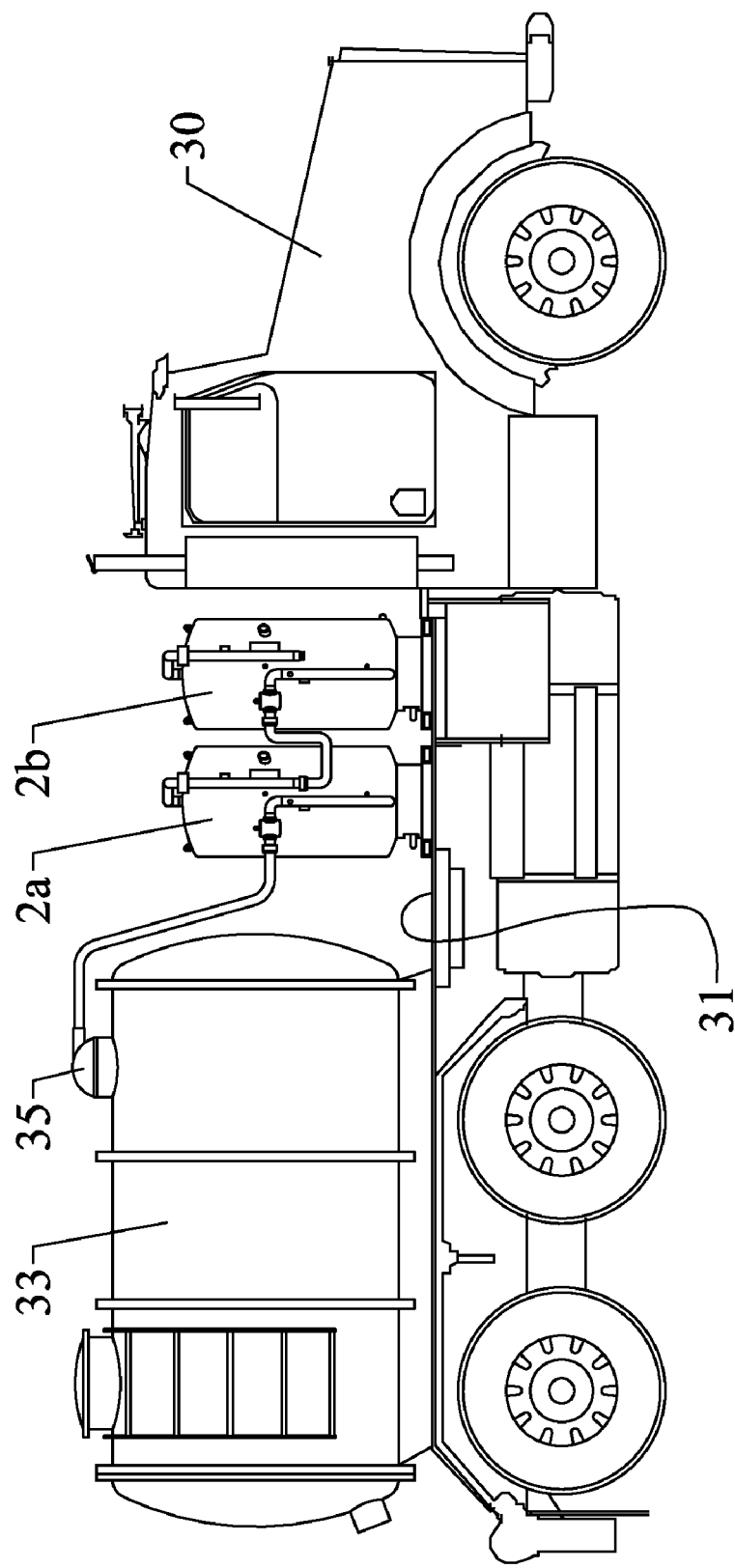
FIG. 4 illustrates an embodiment that depicts that the method can be used on a vacuum truck.

FIG. 4 shows an embodiment of a plurality of scrubbers 2a, 2b connected in series on a transport vehicle, which is depicted as truck 30 in this embodiment. This embodiment shows that a first scrubber 2a can connect to a second scrubber 2b and additional scrubbers can be added to provide versatility in capacity of scrubbing fluids, such as during a start up from a turn around at a chemical plant, when excess capability might be needed for a short time, but not for a long term solution. The modularity of the scrubbers, the ability to mix and match scrubber sizes to a need of a user provides a unique advantage to this invention. Additionally, if a fluid stream needs to be "multiprocessed," that is treated to the same biodiesel or biomass repeatedly, the scrubbers connected in series enable this operation style.

FIG. 4 further shows a truck 30 with a bed 31, a vacuum pump 33 with a vacuum pump exhaust 35. The scrubbers 2a, 2b can be connected to the vacuum pump exhaust 35.

In the embodiment of FIG. 4, it can be contemplated that the scrubbers 2a, 2b can be removably connected to the bed 31 of the truck 30, that is creating a modular transportable system using modular scrubbers. Another embodiment can contemplates welding the scrubbers to the bed of the truck, creating an immovable scrubber on the bed, while the truck is moveable.

Figure 5:
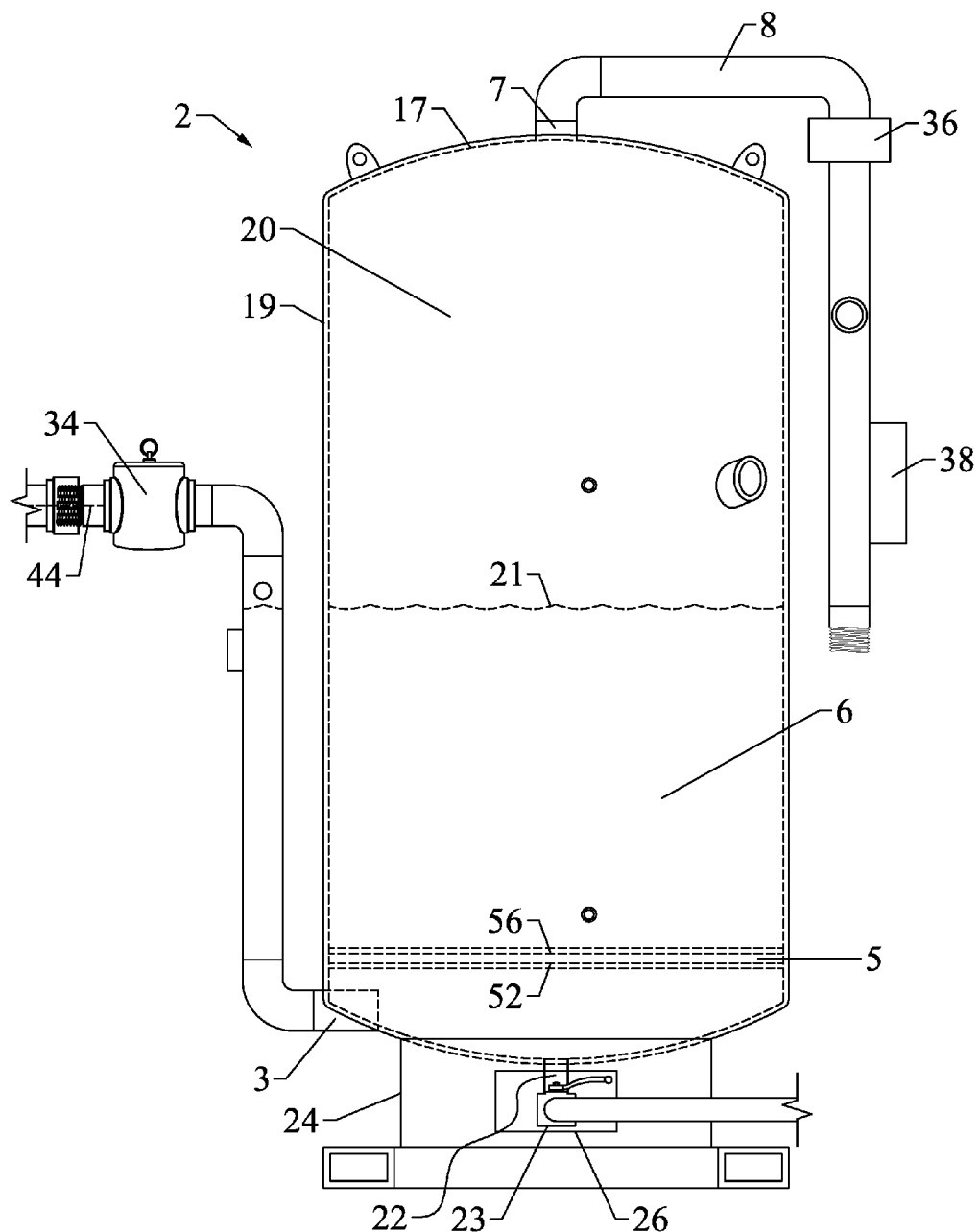
FIG. 5 depicts the method prior to the introduction of the fluid to be scrubbed into the scrubber.

FIG. 5, shows scrubber 2 with biodiesel or biomass 6 prior to introducing the fluid to be scrubbed 44 through the inlet 3. Biodiesel or biomass 6 is shown filling the reaction chamber 20 on both the first side 52 and second side 56 of the sintered permeable membrane 5.

FIG. 6 depicts the scrubber 2 with biodiesel or biomass 6 having moved through the sintered permeable membrane 5. The fluid to be scrubbed 44 is shown flowing from the inlet 3 into the reaction chamber 20. The fluid to be scrubbed 44 can then pass through the sintered permeable membrane 5 forming the reaction zone 46.

The fluid to be scrubbed 44 can have a contamination concentration greater than 0 ppb to saturation, such as in the range of about 20 ppm to about 250 ppm.

The fluid to be scrubbed can be fluid with contaminates that are volatile organic compounds, hazardous air pollutants, hydrogen sulfides, ammonia, sulfur dioxide and combinations thereof. The amounts to be scrubbed for refineries for certain streams have different percentages than for a chemical plant, and the amounts to be cleaned depend on the location of the plant having the fluid to be scrubbed.

The sintered permeable membrane 5 can provide a reaction zone 46 wherein the fluid to be scrubbed 44 can be introduced from the inlet 3 to a first side 52 of the sintered permeable membrane. At the start of the process, the sintered permeable membrane 5 can be immersed in the biodiesel or biomass 6 and all the pores can then be filled with the biodiesel or biomass, as seen in FIG. 5.

Initially the biodiesel or biomass can act as a valve, to control the exit of cleaned fluid, enabling pressure to build up in the housing without the need for an additional exit valve, which enables the scrubber to uniquely behave more reliably.

As the fluid to be scrubbed increases, the pressure beneath the sintered permeable membrane 5, the biodiesel or biomass 6 can begin to move through the pores with the fluid, scrubbing the fluid due to the tremendously increased surface area of the pores.

As scrubbing occurs, a "head pressure" can be created and the biodiesel or biomass 6 can move into the reaction zone 46 above the sintered permeable membrane 5, the fluid to be scrubbed 44 can then be introduced below the sintered permeable membrane 5, in the reaction chamber 20. The fluid to be scrubbed can then move through the sintered permeable membrane 5 into the reaction zone 46.

Cleaned fluid, which is identified herein as scrubbed fluid 12, can flow past a second side 56 of the sintered permeable membrane. The scrubbed fluid 12 has a drop in contamination concentration of at least about 99 percent and gradually decreases to about 70 percent as additional fluid to be scrubbed is introduced to the housing through the inlet without refilling or replacing the biodiesel or biomass.

Scrubbed fluid, as the term is used herein, refers to gas or liquid which has not only passed through the scrubber, but targeted contaminates have been removed and the resulting scrubbed fluid meets or exceed EPA or state standards for "clean air" including but not limited to Title 40 for the EPA and the Texas Administrative Code Title 30, Chapter 106 subpart k, part 263 as well as Chapter 115, subpart d, divisional 1, and Chapters 311-319, which state no more than 20 ppm or 90 percent "removal efficiency" that is 90 percent of the contaminates provide "clean air". Other regulations provide a higher contamination concentration as their definition of "clean air."

In an embodiment, it can be contemplated that the contamination concentration can be between about 562,000 ppm and about 100 ppm for the fluid to be scrubbed.

The scrubbed fluid 12 can exit the reaction chamber 20 through the exit port 7 into the exit conduit 8.

The knock out canister 36 can serve to knock out, remove, or capture any of the liquid that can be entrained in the scrubbed fluid 12. The knock out canister can be located between a vent 38, as shown in FIG. 1, and the exit conduit 8.

Figure 7:
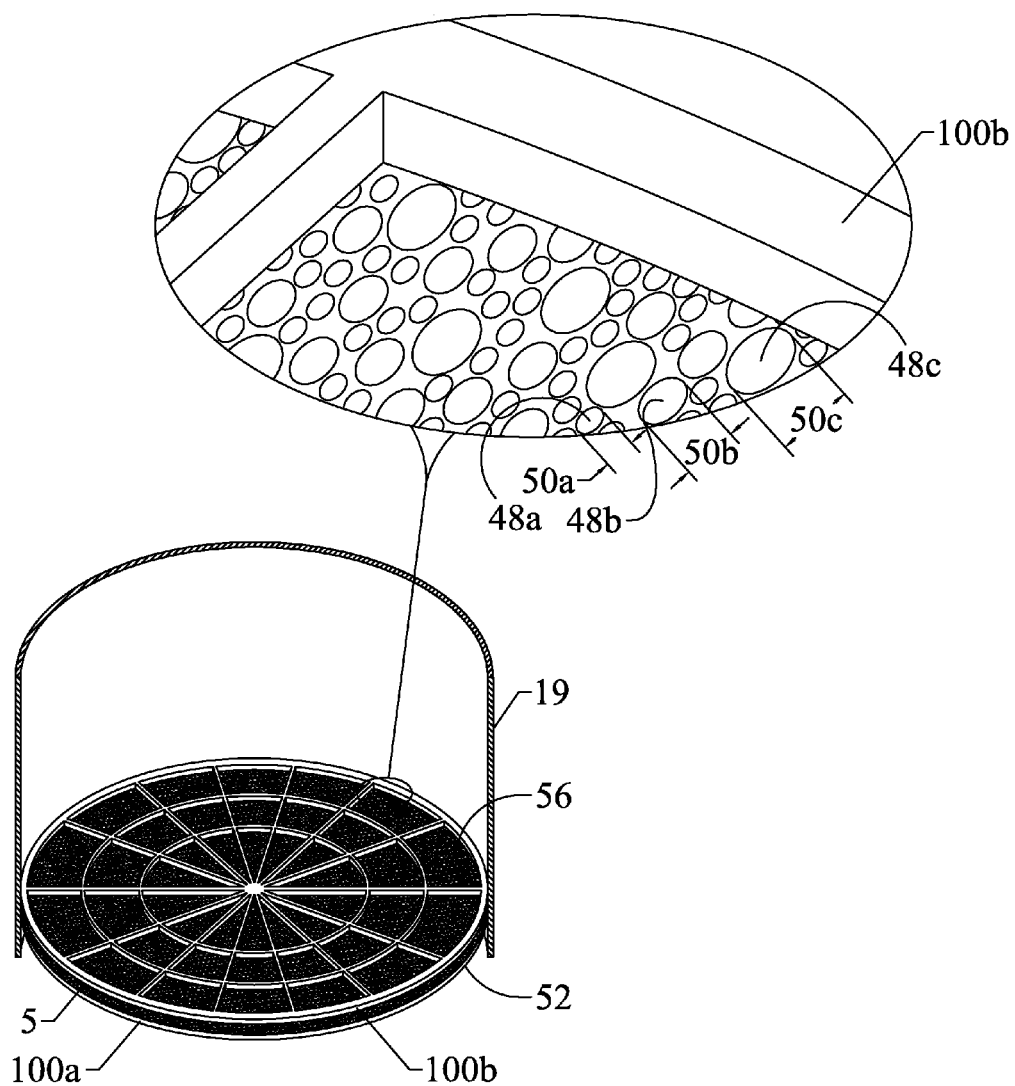
FIG. 7 is a cut view of a housing showing the sintered permeable membrane usable with the method.

FIG. 7, depicts a partial cut view of the housing 19, without a interior liner, revealing the sintered permeable membrane 5.

The sintered permeable membrane 5 can have pores of identical diameters, such as all being about 50 micron diameters. The pores 48a, 48b, 48c can have pore diameters 50a, 50b, 50c, as shown in this Figure. However, the pores can range in diameter between about 1 micron to about 10,000 microns.

The sintered material of the sintered permeable membrane can have void spaces equivalent to between about 40 percent to about 50 percent of the sintered permeable membrane, that is the material making up the membrane can have open spaces that are between about 40 percent to about 50 percent. The sintered material of the sintered permeable membrane can have both internal pores and external pores.

In an embodiment, the void spaces can be greater then 50 percent or less then 40 percent depending upon the sintered material used. For example, if the sintered material used is carbon aerogel, it can have a void fraction of about >680 percent.

The sintered permeable membrane can be between about 1/32 inch thick to about 24 inches thick FIG. 7 further shows that the sintered permeable membrane 5 can be held in place inside the reaction chamber using pad grids 100a, 100b.

Figure 8:
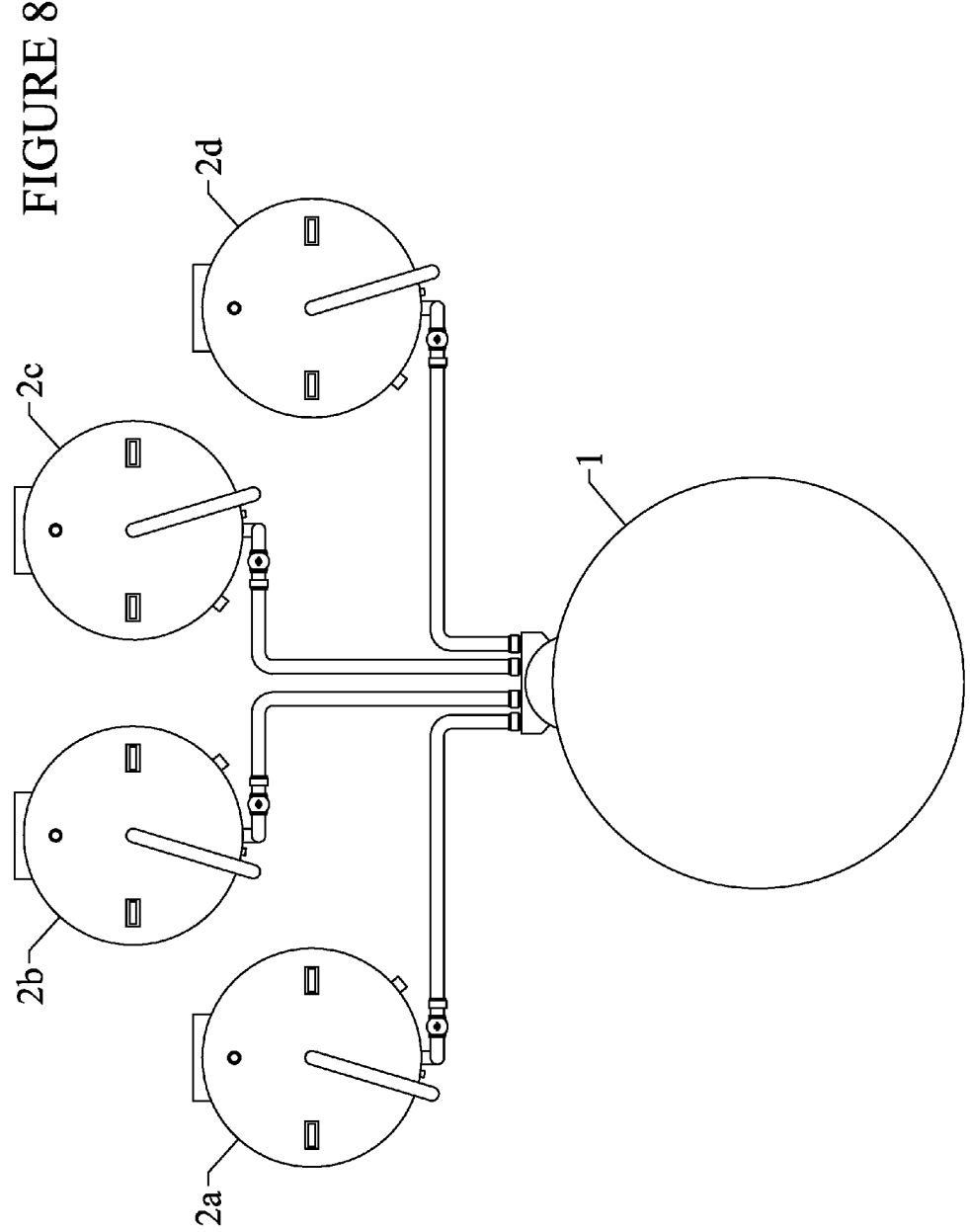
FIG. 8 shows four scrubbers connected in parallel according to an embodiment of the invention.

The sintered permeable membrane can comprise a member of the group consisting of: ceramic, carbon steel, other steel alloys, copper, copper alloys, carbide gel, other carbide materials, carbide films, polyamides, tungsten, polypropylene, carbon aerogels, ferrite magnets, silicon, polyethylene, polybutylene, homopolymers and copolymers thereof, acetates, glass, silica, and combinations of these materials FIG. 8 shows that a plurality of scrubbers 2a, 2b, 2c, 2d can be connected in parallel to a source 1 so that several streams can be treated simultaneously on a vehicle. That is, a large fluid stream can be split into two streams that go to two scrubbers in parallel on a truck or trailer. Between about 2 scrubbers to about 12 scrubbers can be used in this embodiment. Additional scrubbers can be used for this purpose, which can be particularly advantageous in the event of a natural disaster, such as a hurricane, when a plant has gone down due to damage, and needs to be brought back up, but for safety considerations, the streams preventively are run through the scrubbers to ensure there are no additional problems, as sensors may have been damaged by the hurricane and accurate detection might be difficult.

Figure 9:
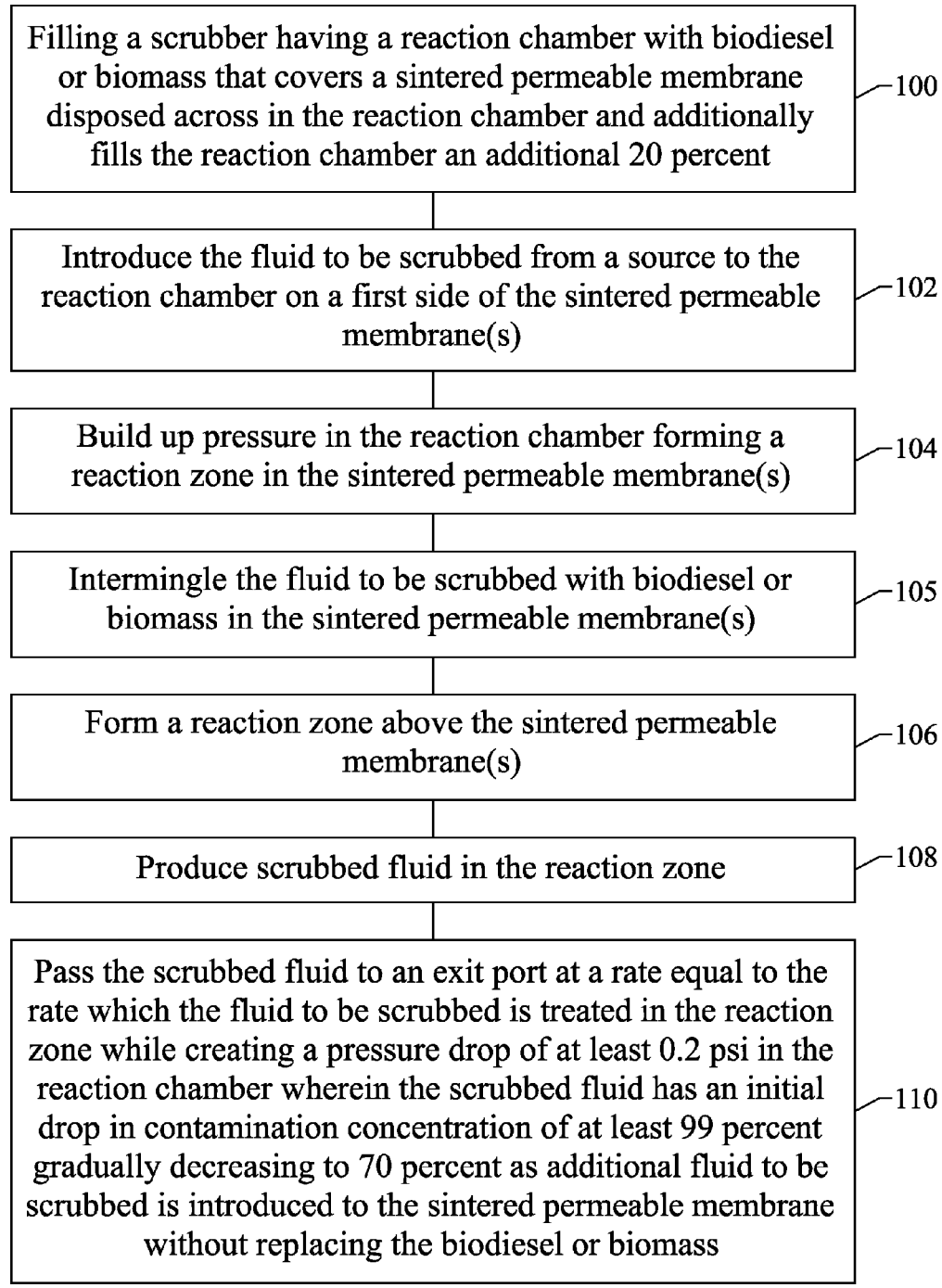
FIG. 9 depicts a method with steps useable for treating fluids to be scrubbed.

FIG. 9 depicts a method with steps useable for treating fluids to be scrubbed.

The method can begin by filling a scrubber having a reaction chamber with biodiesel or biomass that covers a sintered permeable membrane disposed across in the reaction chamber and additionally fills the reaction chamber an additional 20 percent, Step 100.

In Step 102, the method can then introduce the fluid to be scrubbed from a source to the reaction chamber on a first side of the sintered permeable membrane(s).

In Step 104, the method can build up pressure in the reaction chamber forming a reaction zone in the sintered permeable membrane(s).

In Step 105, the method can intermingle the fluid to be scrubbed with biodiesel or biomass in the sintered permeable membrane(s).

The method can then form a reaction zone above the sintered permeable membrane(s), Step 106.

The method can then produce scrubbed fluid in the reaction zone, Step 108; and finally, the method can pass the scrubbed fluid to an exit port at a rate equal to the rate which the fluid to be scrubbed is treated in the reaction zone while creating a pressure drop of at least 0.2 psi in the reaction chamber wherein the scrubbed fluid has an initial drop in contamination concentration of at least 99 percent gradually decreasing to 70 percent as additional fluid to be scrubbed is introduced to the sintered permeable membrane without replacing the biodiesel or biomass, Step 110.

While these embodiments have been described with emphasis on the embodiments, it should be understood that within the scope of the appended claims, the embodiments might be practiced other than as specifically described herein.

What is claimed is:

1. A method for treating fluid to be scrubbed, comprising:
   a. filling a scrubber having a reaction chamber with biodiesel or biomass that covers a sintered permeable membrane disposed across in the reaction chamber and additionally fills the reaction chamber an additional 20 percent;
   b. introducing the fluid to be scrubbed from a source to the reaction chamber on a first side of the sintered permeable membrane(s);

c. building up pressure in the reaction chamber forming a reaction zone in the sintered permeable membrane(s);

d. intermingling the fluid to be scrubbed with biodiesel or biomass in the sintered permeable membrane(s);

e. forming a reaction zone above the sintered permeable membrane(s);

f. producing scrubbed fluid in the reaction zone; and g. passing the scrubbed fluid to an exit port at a rate equal to the rate which the fluid to be scrubbed is treated in the reaction zone while creating a pressure drop of at least 0.2 psi in the reaction chamber wherein the scrubbed fluid has an initial drop in contamination concentration of at least 99 percent gradually decreasing to 70 percent as additional fluid to be scrubbed is introduced to the sintered permeable membrane without replacing the biodiesel or biomass.

2. The method of claim 1, wherein the reaction chamber is filled with biodiesel or biomass at least 20 percent of the volume of the reaction chamber.

3. The method of claim 1, wherein the reaction chamber is filled with biodiesel or biomass at least 33 percent of the volume of the reaction chamber.

4. The method of claim 1, further comprising maintaining a dissipation area of the reaction chamber removing enriched liquid from the scrubbed fluid.

5. The method of claim 1, wherein the filling of the housing with the fluid to be scrubbed creates between 0.5 pounds to 14 pounds of pressure in the reaction chamber enhancing the efficiency of the removal of contaminates from the fluid to be scrubbed.

6. The method of claim 1, wherein the fluid to be scrubbed is introduced to the reaction chamber at a rate between 0.1 cubic feet per minute (CFM) to 20,000 CFM.

7. The method of claim 1, wherein the sintered permeable membrane is flexible and bendable.

8. The method of claim 1, wherein the sintered permeable membrane is tubular.

9. The method of claim 1, wherein the fluid to be scrubbed is a liquid or a gas containing at least one volatile organic component (VOC).

\* \* \* \* \*